C. H. WILLIAMS, Jr.

THIRD POINT SUPPORT FOR BRAKE BEAMS.

APPLICATION FILED NOV. 12, 1915.

Reissued Dec. 21, 1915.

14,034.

Inventor
Charles H. Williams, Jr.
By F. D. Cornwall Atty.

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD-POINT SUPPORT FOR BRAKE-BEAMS.

14,034. Specification of Reissued Letters Patent. Reissued Dec. 21, 1915.

Original No. 1,148,134, dated July 27, 1915, Serial No. 818,936. Application for reissue filed November 12, 1915. Serial No. 61,188.

*To all whom it may concern:*

Be it known that I, CHARLES H. WILLIAMS, Jr., a citizen of the United States, residing at Chicago, in the county of Cook, State of Illinois, have invented a certain new and useful Improvement in Third-Point Supports for Brake-Beams, of which the following is a full, clear, and exact description, such as will enable others skilled in the art to which it appertains to make and use the same, reference being had to accompanying drawings, forming part of this specification, in which—

Figure 1:
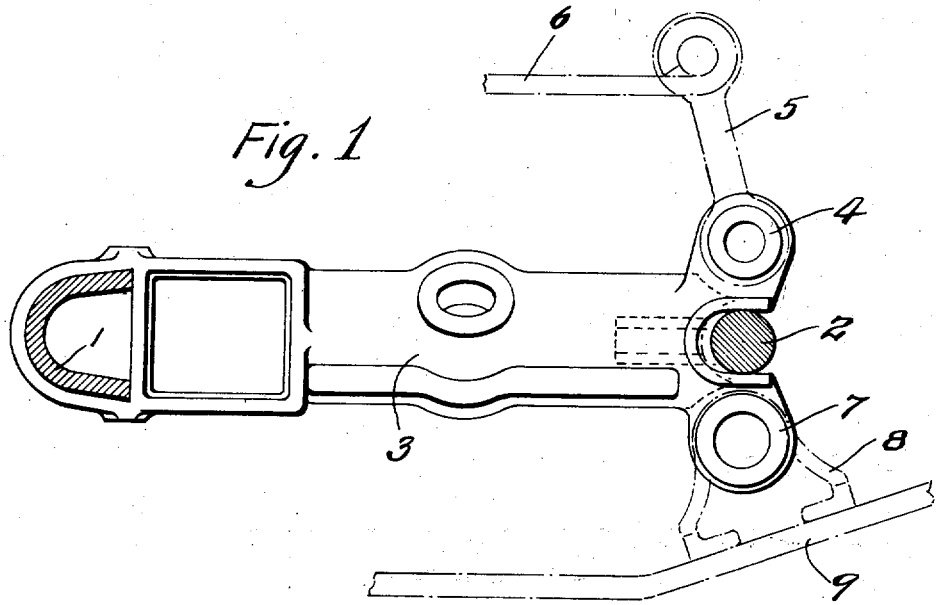
Figure 2:
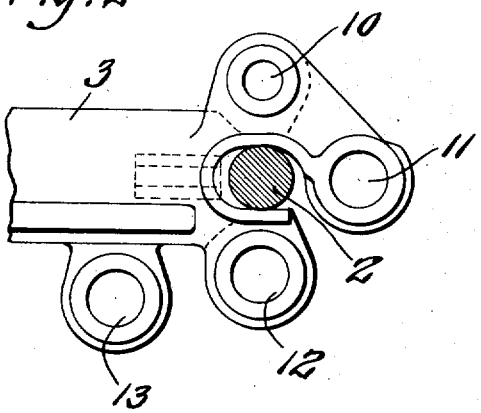

Figure 1 is a view of the brake beam strut illustrating one form of my improved third point support. Fig. 2 is a modification of the outer end of the strut.

This invention relates to a new and useful improvement in third point support for brake beams, the object being to provide the brake beam strut with third point support suspension ears so located that they can properly support the beam whether or not the third suspension spring is used above the beam, or third point support is used below the beam.

By the use of my improved form of strut it is possible for railroads formerly using what is known as an over-head third suspension to adopt the underhung spring design or third point support. As this involves several different locations of hanger holes according to the standards of the different railroads, the forms of strut illustrated in the drawing are designed to provide a single casting having various third point suspension hanger-hole locations.

In Fig. 1, 1 indicates the compression member, 2 the tension member, and 3 a strut of a well known type of brake beam. 4 indicates a perforated lug or ear arranged at the end of the strut (or these lugs may be arranged in pairs) to which may be connected a link 5 pivotally mounted in the eye at the end of the spring 6, if the beam is designed to be used with an overhead suspension. 7 indicates a lug or pair of perforated lugs or ears arranged at the end of the strut below the tension member to which may be secured a shoe or third point support 8 coöperating with the inclined end of a spring 9, if the brake beam is to be used with an underhung spring.

In Fig. 2 I have shown the end of a strut provided with a number of perforated lugs or ears in an opening 10 of which the link of an overhead construction may be employed, or, depending upon the character of the supporting shoe employed, the same may be attached through the medium of the openings 11, 12, or 13.

What I claim is:

In a third point support for brake beams, a brake beam having a strut provided with a plurality of perforated lugs or ears at its outer end located respectively above and below the plane of the tension member, whereby means of attachment are afforded for devices employed when the brake beam is used either with overhead or underhung suspensions or supports.

CHARLES H. WILLIAMS, JR.

Copies of this patent may be obtained for five cents each, by addressing the "Commissioner of Patents, Washington, D. C."